US006568483B2

(12) United States Patent
McCallops et al.

(10) Patent No.: US 6,568,483 B2
(45) Date of Patent: May 27, 2003

(54) INTERCHANGEABLE PISTOL GRIP HANDLES FOR PNEUMATIC TOOLS AND SEALS THEREFOR

(75) Inventors: John A. McCallops, Easton, PA (US); Kurt E. Ashbaugh, Easton, PA (US); Douglas E. Souls, Hackettstown, NJ (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 128 days.

(21) Appl. No.: 09/778,348

(22) Filed: Feb. 7, 2001

(65) Prior Publication Data

US 2002/0104666 A1 Aug. 8, 2002

(51) Int. Cl.[7] ........................ B23B 45/04

(52) U.S. Cl. ................ 173/169; 173/170; 173/162.2

(58) Field of Search ................ 173/168, 169, 173/170, 162.2, 211

(56) References Cited

U.S. PATENT DOCUMENTS 3,827,635 A 8/1974 Krakowski, et al.
4,080,105 A 3/1978 Connell
4,658,869 A 4/1987 Soon-Fu
4,712,983 A 12/1987 Moynihan
4,778,015 A * 10/1988 Jacobsson ................ 173/169
4,872,492 A 10/1989 McAnally et al.
5,627,361 A 5/1997 Lee
5,687,802 A * 11/1997 Spooner et al. ............ 173/170
5,742,238 A 4/1998 Fox
5,797,462 A * 8/1998 Rahm ................ 173/169
5,828,825 A 10/1998 Eskandari et al.
5,855,222 A 1/1999 Jou
5,876,526 A 3/1999 Hamade et al.
5,898,379 A 4/1999 Vanbergeijk
5,918,686 A * 7/1999 Izumisawa ................ 173/169
5,931,207 A 8/1999 Gianino
5,992,540 A * 11/1999 Smolinski et al. .......... 173/169
6,036,101 A 3/2000 Hass et al.
6,062,323 A * 5/2000 Pusateri et al. ............ 173/169
6,082,468 A 7/2000 Pusateri et al. ............ 173/170
6,104,095 A 8/2000 Shin et al.
6,115,763 A 9/2000 Douskey et al.
6,145,069 A 11/2000 Dye
6,150,921 A 11/2000 Werb et al.
6,155,354 A 12/2000 Pusateri et al. ............ 173/170
6,161,628 A * 12/2000 Liu ................ 173/168

OTHER PUBLICATIONS

Dallas Semiconductor Corporation: Automatic Information Overview, Copyright 2000 Dallas Semiconductor Corporation –2 pages.

(List continued on next page.)

*Primary Examiner*—Scott A. Smith
(74) *Attorney, Agent, or Firm*—Michael Best & Friedrich LLP

(57) ABSTRACT

A pneumatic tool is provided having a housing with an exhaust passageway and a handle. The handle has an inlet that receives the housing, an outlet having at least one exhaust port, and an interior surface that defines an exhaust chamber. The exhaust passageway, exhaust chamber, and the at least one exhaust port are sequentially in fluid communication when the housing is inserted into the handle. A seal disposed between the interior surface of the handle and the housing, the seal being located between the exhaust chamber and the inlet. Also provided is a handle substrate with an inlet that receives the housing and an interior surface that defines an exhaust chamber. The exhaust chamber is in fluid communication with the exhaust passageway when the housing is inserted into the handle. An endcap is removably attached to the handle and has an outlet with at least one exhaust port in fluid communication with the exhaust chamber. A seal is disposed at an interface between the handle and the endcap.

8 Claims, 3 Drawing Sheets

OTHER PUBLICATIONS

Dallas Semiconductor DS2506, 64 –kbit Add–Only Memory, Jun. 21, 2000, 25 pages.

Pending U.S. patent application Ser. No. 09/578,018, Filed May 24, 2000, Pistol Air Tool Having A Flat Tilt Valve, Docket No. 5801–88, 25 pages.

Pending U.S. patent application Ser. No. 29/136,781, Filed Feb. 7, 2001, Notice of Allowance received Apr. 10, 2001, Pneumatic Tool, Docket No. 4447–DS1–IR–FS, 4 pages.

Pending U.S. patent application Ser. No. 09/783,898, Filed Feb. 15, 2001, Pneumatic Tool Housings Having Embedded Electronic Devices, Docket No. 4449–IR–FS, 30 pages.

* cited by examiner

INTERCHANGEABLE PISTOL GRIP HANDLES FOR PNEUMATIC TOOLS AND SEALS THEREFOR

FIELD OF THE INVENTION

The present invention relates to handheld pneumatic power tools and more particularly to handheld pneumatic tools having interchangeable pistol handles having different ergonomic sizes and shapes and seals therefor.

BACKGROUND OF THE INVENTION

In a manufacturing facility engaged in mass production, air tools are often used on the assembly line. In operating an air tool over the course of a typical shift, a worker encounters substantial stresses and strains on muscles and ligaments of the hand and arm. The stresses and strains increase worker fatigue. This is particularly true for a rotating air tool, such as a boltdriver, a nutrunner, a screwdriver, or a drill, which must be gripped tightly to resist both reaction torque of the tool and to provide the axial force necessary to insure tool engagement.

The science of ergonomics or human engineering has attempted to address many of the problems facing today's assembly line workers including those problems facing a worker operating a rotating tool. Typically, by providing contoured handles which closely fit a gripped hand the stresses and strains caused by a tool can be alleviated. However, typically such contoured handles have been provided as an integral part of the tool and cannot be removed. Thus, if the plastic grip is damaged or not desirable to a particular operator, there are no alternatives but to replace the relatively expensive motor housing having the integral grip or force the operator to use a tool which is damaged or not comfortable to him.

It is clear that what is needed is a handle which is truly ergonomic, in the sense that the handle should be readily detachable and so that the grip can be replaced if damaged or interchanged with pistol grips having different ergonomic sizes and shapes, if desired by the operator.

The foregoing illustrates limitations known to exist in present pneumatic operated power tools. Thus it is apparent that it would be advantageous to provide an alternative directed to overcoming one or more of the limitations set forth above. Accordingly a suitable alternative is provided including the features more fully disclosed hereinafter.

SUMMARY OF THE INVENTION

According to the present invention, a pneumatic tool is provided having a housing with an exhaust passageway and a handle. The handle has an inlet that receives the housing, an outlet having at least one exhaust port, and an interior surface that defines an exhaust chamber. The exhaust chamber, the exhaust passageway and at least one exhaust port are sequentially in fluid communication when the housing is inserted into the handle. A seal is disposed between the interior surface of the handle and the housing, the seal being located between the exhaust chamber and the atmosphere.

Also provided is a handle with an inlet that receives the housing and an interior surface that defines an exhaust chamber. The exhaust chamber is in fluid communication with the exhaust passageway when the housing is inserted into the handle. An endcap is removably attached to the handle and has an outlet with at least one exhaust port in fluid communication with the exhaust chamber. A seal is disposed at an interface between the handle and the endcap.

The foregoing and other aspects of the present invention will become apparent from the following detailed description of the invention when considered in conjunction with the accompanying drawings. It must be understood, however, that the figures are not intended as definitions of the invention but are only for the purpose of illustration.

DETAILED DESCRIPTION OF THE PREFERRED EMBODIMENTS

Figure 1:
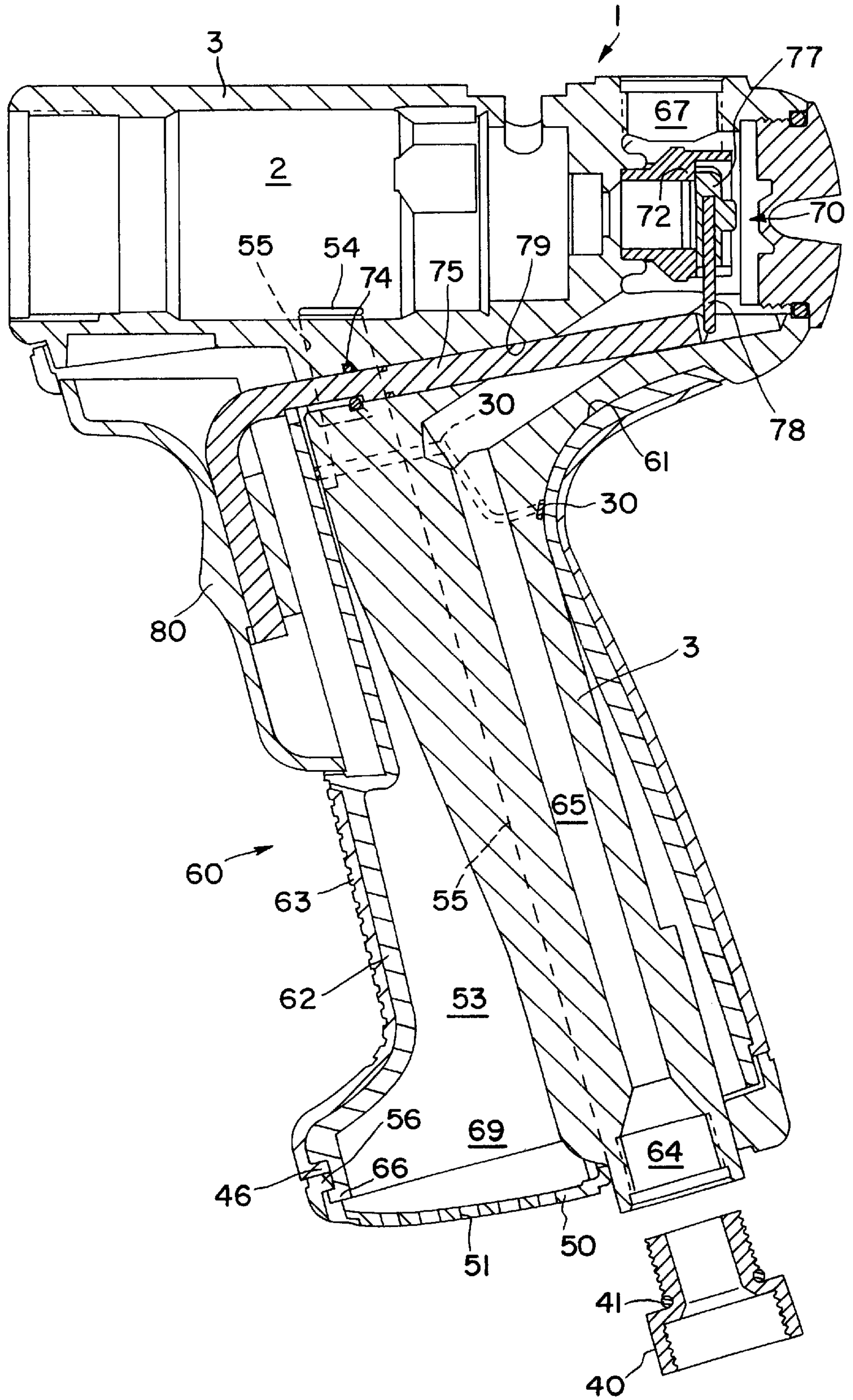
FIG. 1 is a partial cross-sectional side view schematically illustrating an interchangeable pistol grip handle having a sealing gasket according to the present invention incorporated into a pneumatic tool.

The invention is best understood by reference to the accompanying drawings in which like reference numbers refer to like parts. It is emphasized that, according to common practice, the various dimensions of the pneumatic tool and the associated component parts as shown in the drawings are not to scale and have been enlarged for clarity.

Figure 2:
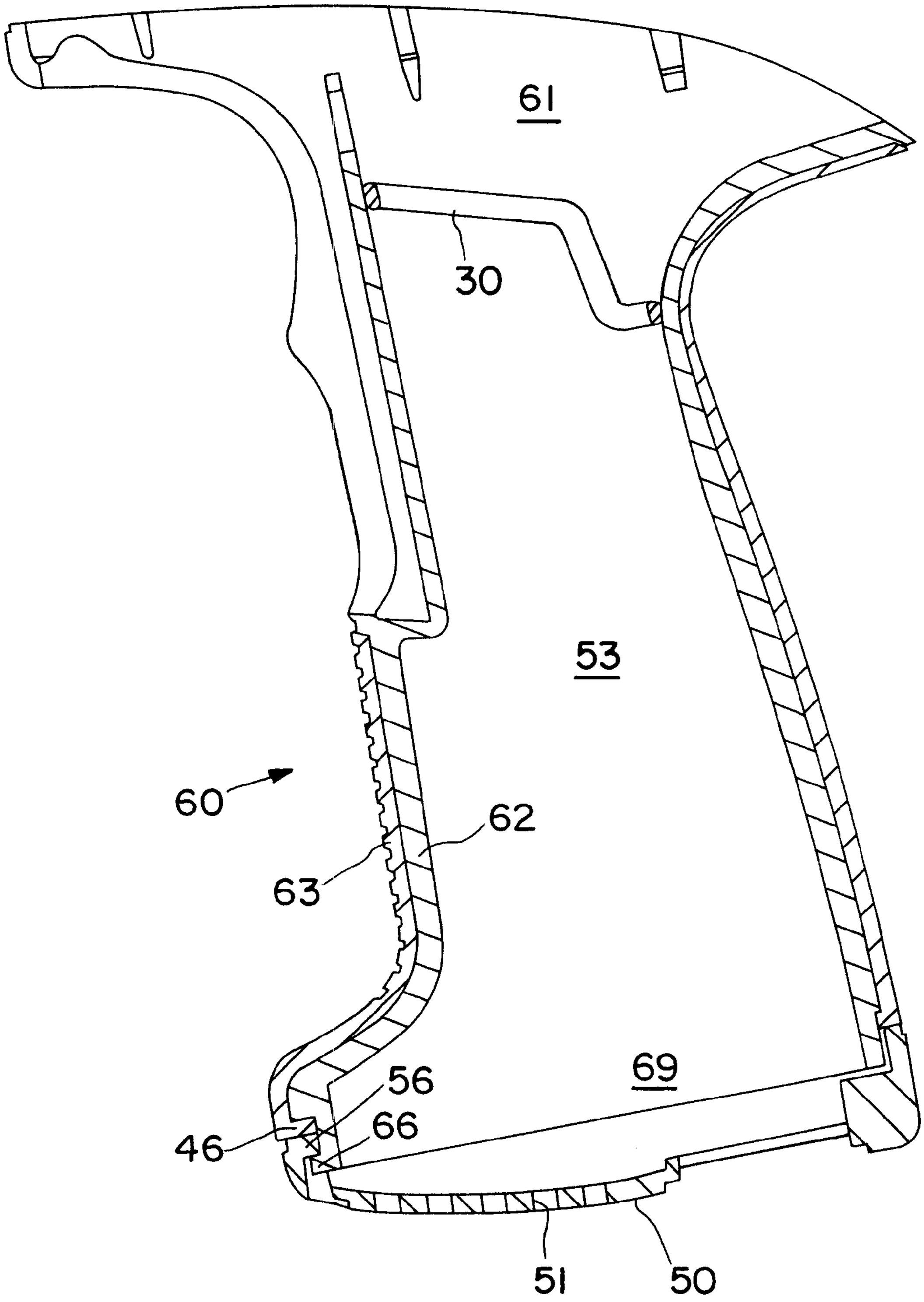
FIG. 2 is a partial cross-sectional side view of the pistol grip handle and sealing gasket according to the present invention.

Referring now to the drawings, shown in FIGS. 1–2, a handheld pneumatic power tool 1 having a housing attached to a removable, and thus interchangeable, handle 60 in the form of a pistol grip is disclosed. Handle 60 has an inlet 61 that receives a housing 3 having an exhaust passageway 55; an outlet 69 having at least one exhaust port 51; and an interior surface that defines an exhaust chamber 53. The exhaust passageway 55, the exhaust chamber 53, and the at least one exhaust port 51 are sequentially in fluid communication when the housing 3 is inserted into the handle inlet 61.

Figure 3:
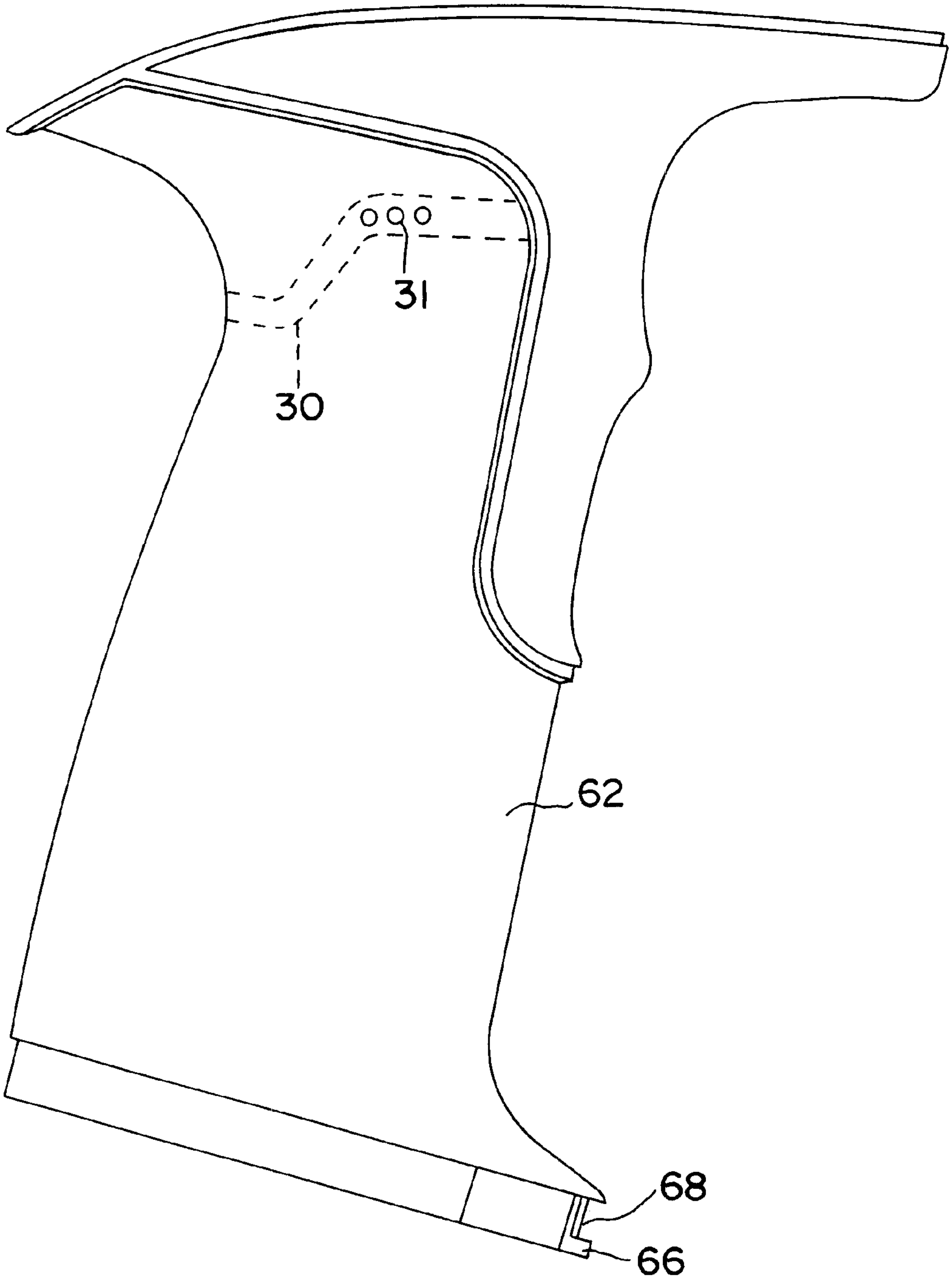
FIG. 3 is a side view of a handle substrate incorporated into the pistol grip handle of FIGS. 1 and 2.

The at least one exhaust port 51 is located in an endcap 50 provided on handle 60 to permit venting of the exhaust air to atmosphere as described in detail below. An externally threaded inlet bushing 40 is provided that engages internal threads located in a bottom fluid inlet 64 to secure handle 60 and end plate 50 to housing 3. Also provided is an O-ring 41 to prevent leakage between the inlet bushing 40 and bottom fluid inlet 64 once they are threadingly engaged. A grip surface 63 is over-molded onto a handle substrate 62 (shown in detail in FIG. 3) and as described in detail below.

Preferably, tool 1 includes both a bottom fluid inlet 64 and a top fluid inlet 67 to provide alternate mounting locations for a motive fluid source (not shown), a throttle control mechanism 70, and a fluid motor 2. Fluid motor 2 is preferably a vane motor which produces rotary output for an output spindle, however, the present invention can be adapted for any fluid-powered motor.

Bottom fluid inlet 64 is located within housing 3 and receives pneumatic pressure fluid which is distributed to the power tool through an inlet passageway 65 and throttle control mechanism 70. Alternately, pneumatic pressure fluid can be provided to throttle control mechanism 70 via top fluid inlet 67. A plug (not shown) is inserted into bottom air inlet 64 or top air inlet 67 when not in use. Throttle control mechanism 70 is comprised of a valve element 77 of the tilt valve or aerosol valve variety which is held against a valve seat 72 by inlet air pressure. The valve element 77 is tilted in operation by means of a valve pin 78 which in turn is displaced by a trigger stem 75 associated with an operating trigger 80 located on the front end of handle 60. The trigger 80 is reciprocally mounted in a trigger bore 79 and is sealed to prevent air flow along the bore by means of an O-ring seal 74.

The exhaust fluid from the vane motor, which in the case of a pneumatic tool is air, exits tool 1 sequentially through an exhaust aperture 54, exhaust passageway 55, exhaust chamber 53, and to atmosphere through exhaust ports 51. Because of the interchangeability of the handle 60, however, an interface exists between the handle 60 and housing 3 across which exhaust air passing to exhaust chamber 53 can escape and blow onto the hand and trigger finger of a user, thus creating an obvious nuisance to the user. Moreover, in the case of tools which utilize exhaust speed controls (not shown) built within the exhaust chamber 53 of handle 60, this air leakage is further increased due to the increased back exhaust air pressure created when choking the exhaust air of the tool.

According to the present invention, provided between the interior surface of handle 60 and housing 3 is a seal preferably in the form of a gasket 30 that is located between the exhaust chamber 53 and the inlet 61. Gasket 30 is disposed around the periphery of the interior surface of the handle and acts to seal exhaust air that is passing into exhaust chamber 53 from escaping out the interface where the inner surface of handle 60 meets the exterior of housing 3. By this construction, air leakage onto a user's hand placed on handle 60 and onto the user's fingers located on trigger 80 is prevented thus avoiding the associated nuisance to the user.

In constructing the handle design of the invention, preferably the interior surface of handle 60 is defined by a handle substrate 62 with a grip surface 63 covering the exterior of handle substrate 62. Preferably, grip surface 63 is a textured rubber or other soft-touch, elastomeric material to provide the friction needed for providing a good grip. Manufacture of grip surface 63 is accomplished by over-molding the soft-touch grip material over the gripping surface of handle substrate 62 shown in FIG. 3. Manufacture of handle 60 in this fashion permits the simultaneous formation of the grip surface 63 and gasket 30, thereby forming gasket 30 integrally with grip surface 63. This is accomplished by providing at least one through hole and, preferably, a series of holes 31 in handle substrate 62 that permit the soft-touch over-mold material to flow onto the inside surface of the handle substrate 62 to form gasket 30 while grip surface 63 is being molded. An inner mold (not shown) is used to form the gasket 30 to the desired shape shown in FIGS. 1–3. The soft-touch material is optimal for forming the gasket because it is a soft durometer material.

As shown in FIG. 1, endcap 50 is held to housing 3 by an inlet bushing 40 that is removably attached to the housing through the endcap. Preferably, to prevent leakage between the interface between handle 60 and endcap 50, a seal is provided as shown at the interface between handle 60 and endcap 50. Preferably, this seal is integrally formed during the over-molding of grip surface 63 as a lip 46 of the soft-touch, elastomeric material that fits within a channel 68 on handle substrate 62. As shown in FIGS. 1 and 2, lip 46 contacts and acts as a seal on endcap 50 when the endcap is attached to the handle.

In prior art pneumatic devices having end caps attached to a handle, occasional separation of the endcap 50 and handle 60 at the front-end interface was possible resulting in air leakage on the hand of a user at the grip/endcap interface. The present inventors have discovered that this is caused by an uneven compressive force provided by inlet bushing 40 mostly at the back end of endcap 50 combined with exhausting air pressure in exhaust chamber 53. To alleviate this problem, a ledge 66 is provided into handle substrate 62 that engages hook 56 to prevent the separation of lip 46 and endcap 50. As a result, air leakage on the hand of a user at the grip/endcap interface is eliminated by this interference fit design without the need for any extra gaskets, O-rings, or welding of the endcap in place. Moreover, by avoiding the need for welding the endcap in place, the additional manufacturing cost is eliminated while preserving the ability to perform maintenance on the tool by permitting the easy removal of the endcap.

Preferably, handle substrate 62 and endcap 50 are injection-molded plastic parts which permits the easy formation of the through holes 31, ledge 66, and hook 56 during the molding process thus eliminating the need for special tooling or machining operations.

Thus, according to the present invention an interchangeable pistol grip handle is provided that provides a soft, pliable seal surface for sealing the handle to the main tool housing and to its endcap. The gasket seal inside the grip separates the tool's exhaust from flowing out of the housing thereby preventing leakage around the trigger and the interface between the handle and the housing. The seal between the handle and the endcap prevents leakage at the lower front end of the handle grip surface. Thus, both seals help prevent annoying air leakage onto the hand and fingers of a user. Moreover, these seals are easily manufactured during an over-molding process used to provide a grip surface while incorporating the same soft durometer material used therein.

While embodiments and applications of this invention have been shown and described, it will be apparent to those skilled in the art that many more modifications are possible without departing from the inventive concepts herein described.

For example, although gasket 30 and lip 46 are shown and described as having particular configurations it is envisioned that the shapes and sizes of these components may be varied to optimize their sealing capabilities. Moreover, while gasket 30 and lip 46 are shown being used together, it will be readily recognized that one seal may be used without the other in a particular tool in which the attendant deficit of air leakage caused by the missing seal can be tolerated. Additionally, the use of one seal without the other may be employed when eliminating a joint interface, e.g., in cases where the endcap 50 is formed integrally with the handle 60, again while realizing the attendant drawbacks discussed above of not having a removable endcap.

It is understood, therefore, that the invention is capable of modification and therefore is not to be limited to the precise details set forth. Rather, various modifications may be made in the details within the scope and range of equivalents of the claims without departing from the spirit of the invention.

What is claimed is:

1. A pneumatic tool comprising:

a housing having an exhaust passageway;

a handle having an inlet that receives said housing;

an outlet having at least one exhaust port; and a handle substrate having an interior surface that defines an exhaust chamber, said exhaust passageway, said exhaust chamber, and said at least one exhaust port being sequentially in fluid communication when said housing is inserted into said handle; and an exterior surface and a grip surface covering said exterior of said handle substrate; and a seal disposed between said interior surface of said handle and said housing, said seal being a gasket formed integrally with said grip surface and disposed around the periphery of the interior surface of said handle and located between said exhaust chamber and said inlet.

2. The pneumatic tool according to claim 1 wherein said gasket and said grip surface are formed from an elastomeric material over-molded respectively onto said interior and exterior surfaces of said handle substrate.

3. The pneumatic tool according to claim 2 wherein said handle substrate further comprises at least one through hole connecting said interior and said exterior surfaces of said handle substrate to permit said over-molded elastomeric material to flow through and integrally connect said grip surface and said gasket.

4. A pneumatic tool comprising:

a housing having an exhaust passageway;

a handle having a handle substrate with an inlet that receives said housing and an interior surface that defines an exhaust chamber, said exhaust chamber being in fluid communication with said exhaust passageway when said housing is inserted into said handle; and an endcap removably attached to said handle by a hook that engages a ledge located on an exterior surface of said handle substrate and having an outlet with at least one exhaust port in fluid communication with said exhaust chamber; and a seal disposed at an interface between said handle and said endcap.

5. The pneumatic tool according to claim 4 wherein said endcap is further attached to said handle by an inlet bushing that is removably attached to said housing through said endcap.

6. A pneumatic tool comprising:

a housing having an exhaust passageway;

a handle having a handle substrate with an inlet that receives said housing and an interior surface that defines an exhaust chamber, said exhaust chamber being in fluid communication with said exhaust passageway when said housing is inserted into said handle; and an endcap removably attached to said handle and having an outlet with at least one exhaust port in fluid communication with said exhaust chamber; and a seal disposed at an interface between said handle and said endcap and further comprising a grip surface disposed externally on said handle substrate, said grip surface having a lip provided between and in contact with said endcap and said handle when said endcap is attached to said housing.

7. The pneumatic tool according to claim 6 wherein said seal is formed integrally with said grip surface.

8. The pneumatic tool according to claim 7 wherein said seal and said grip surface are formed from an elastomeric material over-molded onto said handle substrate.

* * * * *